US011200339B1

(12) United States Patent
Szentes et al.

(10) Patent No.: US 11,200,339 B1
(45) Date of Patent: Dec. 14, 2021

(54) SYSTEM FOR SECURING ELECTRONIC PERSONAL USER DATA

(71) Applicant: UIPCO, LLC, San Antonio, TX (US)

(72) Inventors: Michael Jay Szentes, San Antonio, TX (US); Sumita T. Jonak, San Antonio, TX (US); Brian Christopher Hawes, San Antonio, TX (US); Shane Elliot Richard, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 275 days.

(21) Appl. No.: 16/539,728

(22) Filed: Aug. 13, 2019

Related U.S. Application Data (60) Provisional application No. 62/773,472, filed on Nov. 30, 2018.

(51) Int. Cl.
*G06F 21/62* (2013.01)
(52) U.S. Cl.
CPC ............... *G06F 21/6245* (2013.01)
(58) Field of Classification Search
CPC .................................. G06F 21/6245
See application file for complete search history.

(56) References Cited

U.S. PATENT DOCUMENTS

| | | | | |
|---|---|---|---|---|
| 6,317,783 | B1* | 11/2001 | Freishtat | G06Q 30/00 709/218 |
| 10,685,136 | B1* | 6/2020 | Hecht | G06F 21/6245 |
| 2005/0044423 | A1* | 2/2005 | Mellmer | G06F 21/41 726/4 |
| 2006/0253586 | A1* | 11/2006 | Woods | G06F 16/9535 709/226 |
| 2007/0055666 | A1* | 3/2007 | Newbould | G06Q 30/02 |
| 2009/0119299 | A1* | 5/2009 | Rhodes | G06F 21/554 |
| 2011/0161462 | A1* | 6/2011 | Hussain | H04L 29/08072 709/219 |
| 2014/0150109 | A1* | 5/2014 | Fire | G06Q 10/101 726/26 |
| 2015/0356643 | A1* | 12/2015 | Kohm | G06Q 30/0282 705/347 |
| 2017/0140174 | A1* | 5/2017 | Lacey | G06F 21/6245 |
| 2019/0068608 | A1* | 2/2019 | Boland | G06F 21/6245 |
| 2021/0119794 | A1* | 4/2021 | Shpurov | G06F 21/6245 |
| 2021/0124479 | A1* | 4/2021 | Atieh | H04L 67/306 |

* cited by examiner

*Primary Examiner* — Harris G Wang
(74) *Attorney, Agent, or Firm* — Plumsea Law Group, LLC (57) ABSTRACT

The present disclosure relates to a system, method, and apparatus for securing electronic personal identifying information. The system enhances data privacy, by minimizing the amount of authentic personal identifying information that is shared with a third party. Namely, the system includes a database of known websites, apps, etc. that require personal identifying information to sign up—and then classifies whether any given type of information is strictly necessary to the functioning of the website. The system then generates placeholder "dummy" data for any fields that are required for signup, but are not strictly necessary for the website to function. The system allows for creation of several user profiles that vary the amount of authentic personal identifying information to be shared, based on the user's preferences. The system therefore helps to secure personal information in the event that, for example, the website later has a data breach. Such a system may be useful, for example, as a smartphone app or as a web browser plugin.

10 Claims, 10 Drawing Sheets

| | TYPE OF PERSONAL IDENTIFYING INFORMATION | FIRST PROFILE (ACCURATE) | SECOND PROFILE (MIXED) | THIRD PROFILE (PLACEHOLDER) |
|---|---|---|---|---|
| 1 | FULL NAME | ROBERT SMITH | ROBERT SMITH | JOHN DOE |
| 2 | EMAIL ADDRESS | ROBERTSMITH@GMAIL.COM | ROBERTSMITH@GMAIL.COM | FAKE@FAKE.COM |
| 3 | SOCIAL SECURITY # | 001-20-0003 | 999-22-9999 | 999-22-9999 |
| 4 | PASSPORT # | 31195855 | 99919999 | 99919999 |
| 5 | VEHICLE PLATE | VBE-5111 | ABC-1234 | ABC-1234 |
| 6 | DRIVER'S LICENSE # | T16700185 | T99922555 | T99922555 |
| 7 | BIOMETRIC DATA | [ACCURATE FINGERPRINT] | [GENERATED FINGERPRINT] | [GENERATED FINGERPRINT] |
| 8 | CREDIT CARD # | 5633 2222 3333 6687 | 5633 2222 3333 6687 | 1111 2222 3333 4444 |
| 9 | DATE OF BIRTH | 01/23/1981 | 01/23/1981 | 02/24/1982 |
| 10 | PLACE OF BIRTH | ALEXANDRIA, VIRGINIA | HOUSTON, TEXAS | HOUSTON, TEXAS |
| 11 | AGE | 37 | 37 | 36 |

FIG. 1A

| | TYPE OF PERSONAL IDENTIFYING INFORMATION | FIRST PROFILE (ACCURATE) | SECOND PROFILE (MIXED) | THIRD PROFILE (PLACEHOLDER) |
|---|---|---|---|---|
| 12 | GENDER | MALE | MALE | NOT SPECIFIED |
| 13 | RACE | CAUCASIAN | OTHER | OTHER |
| 14 | MOTHER'S MAIDEN NAME | JONES | SMITH | SMITH |
| 15 | PET'S NAME | SIR WOOFINGTON | SPOT | SPOT |
| 16 | SCHOOL NAME | NORTHERN VIRGINIA COMMUNITY COLLEGE | HARVARD | HARVARD |
| 17 | WORKPLACE | SAVE THE WHALES | THE HUMAN FUND | THE HUMAN FUND |
| 18 | TELEPHONE # | 703-867-5309 | 703-867-5309 | 555-867-5552 |
| 19 | ADDRESS - STREET # | 123 | 420 | 420 |
| 20 | ADDRESS - STREET NAME | MAIN ST. | MAIN ST. | SOUTH AVE. |
| 21 | ADDRESS - CITY | ARLINGTON | ARLINGTON | DENVER |
| 22 | ADDRESS - STATE | VIRGINIA | VIRGINIA | COLORADO |
| 23 | ADDRESS - ZIP CODE | 22204 | 22204 | 80014 |

FIG. 1B

| | TYPE OF PII | SECOND PROFILE (ALL FIELDS, MIXED) | SECOND PROFILE (MIXED, WITH SOME FIELDS OMITTED) |
|---|---|---|---|
| 1 | FULL NAME | ROBERT SMITH | ROBERT SMITH |
| 2 | EMAIL ADDRESS | ROBERTSMITH@GMAIL.COM | ROBERT SMITH |
| 3 | SOCIAL SECURITY # | 999-22-9999 | |
| 4 | PASSPORT # | 99919999 | |
| 5 | VEHICLE PLATE | ABC-1234 | |
| 6 | DRIVER'S LICENSE # | T99922555 | |
| 7 | BIOMETRIC DATA | [GENERATED FINGERPRINT] | |
| 8 | CREDIT CARD # | 5633 2222 3333 6687 | 5633 2222 3333 6687 |
| 9 | DATE OF BIRTH | 01/23/1981 | 02/24/1982 |
| 10 | PLACE OF BIRTH | HOUSTON, TEXAS | |
| 11 | AGE | 37 | 36 |
| 12 | GENDER | MALE | MALE |
| 13 | RACE | OTHER | |
| 14 | MOTHER'S MAIDEN NAME | SMITH | |
| 15 | PET'S NAME | SPOT | |
| 16 | SCHOOL NAME | HARVARD | |
| 17 | WORKPLACE | THE HUMAN FUND | |
| 18 | TELEPHONE # | 703-867-5309 | 703-867-5309 |
| 19 | ADDRESS - STREET # | 420 | 420 |
| 20 | ADDRESS - STREET NAME | MAIN ST. | SOUTH ST. |
| 21 | ADDRESS - CITY | ARLINGTON | ARLINGTON |
| 22 | ADDRESS - STATE | VIRGINIA | VIRGINIA |
| 23 | ADDRESS - ZIP CODE | 22204 | 22204 |

SYSTEM FOR SECURING ELECTRONIC PERSONAL USER DATA

CROSS-REFERENCE TO RELATED APPLICATIONS

This application claims the benefit of Provisional Patent Application No. 62/773,472 filed Nov. 30, 2018 and titled "System for Securing Electronic Personal User Data," which is incorporated by reference herein in its entirety.

TECHNICAL FIELD

The present disclosure relates to the field of electronic password and user account management. Login management systems help secure electronic personal information across the many websites, apps, and other digital portals that a user commonly uses in their modern life.

BACKGROUND

Many well-known password and user account management systems are known in the art of personal digital security. Designed to address the problem of "too many logins to remember", these systems unusually store login and user account information so that a user need not remember such information themselves—or need to resort to low-tech solutions like a password written on a sticky note. Due to the ever increasing number of websites, apps, and other portals that require login information, some users may repeat usernames and passwords. Many websites also require personal identifying information to be submitted as part of the sign up process. As a result, critical digital personal information is subject to breach—either at the individual account level, or a data beach of an entire system as has frequently been reported in the news. Users may be subject to identity theft, or other unfortunate consequences, as a result of a data breach.

Known user account management systems seek to alleviate these problems in several ways. For example, some such systems can automatically generate very strong passwords for each separate website or other login portal. This helps to avoid the situation where a user repeats the same password on two different websites. Other known user account management system may store personal information, such as name, address, telephone, and credit card number—so that these pieces of data are accurate recalled and inputted when creating a new user account on a website.

Known password and user account management systems include software such as LastPass, RoboForm, KeePass, and similar features built into some web browsers such as Google Chrome, Firefox, and Opera.

However, existing systems do not currently seek to minimize the personal information submitted to a third-party website or other login portal. Generally, they merely recall a set of accurate personal identifying information that a user has previously entered and then generate a unique password. However, data breaches may happen for a variety of reasons beyond merely failing to pick a strong password. These existing system therefore may allow personal identifying information to be unnecessarily disseminated.

There is a need in the art for systems, devices, and methods that addresses the shortcomings of the prior art discussed above.

SUMMARY OF THE DISCLOSURE

In one aspect, the disclosure provides a system for securing electronic user account data, comprising: at least one computing device, the computing device including a processor, and wherein the computing device is configured to perform the steps of: (1) prompting a user to input accurate personal identifying information; (2) receiving the accurate personal identifying information and generating a first personal information profile consisting of the accurate personal identifying information; (4) receiving placeholder information, the placeholder information being of the same data format as the accurate personal identifying information; (5) generating a second personal information profile including a mixture of the accurate personal identifying information and the placeholder information; (6) generating a third personal information profile, consisting of the placeholder information; (7) receiving an input regarding creation of a user account associated with a login portal; (8) prompting the user to select one of the first personal information profile, the second personal information profile, and the third personal information profile; (9) associating the selected personal information profile with the user account; (10) storing the user account, associated personal information profile, and the relation between the user account and the login portal, in an electronic database; and (11) recalling the user account and associated personal information profile from the electronic database upon a subsequent interaction with the login portal.

In another aspect, the disclosure provides a method of operating a plug-in for a web browser, comprising the steps of: (1) receiving an input regarding creation of a user account, the user account being associated with a login portal, the login portal including one or more input fields requesting personal identifying information; (2) comparing the login portal with the database, the database including information regarding known login portals; (3) providing to the user a recommendation regarding each of the one or more input fields requesting personal identifying information, the recommendation including whether accurate personal identifying information or placeholder data should be associated with the user account for the login portal at that input field; the recommendation being based on information in the database of known login portals describing each of the one or more input fields associated with the login portal as either essential to the functioning of the login portal or nonessential to the functioning of the login portal; (5) receiving a request for placeholder data from the user with respect to at least one of the one or more input fields; (6) generating placeholder data for each input field for which the user initiates the request for placeholder data, the placeholder data being of the same format as the personal identifying information requested by the input field; and (6) sending the placeholder data to the login portal.

In another aspect, this disclosure provides a mobile computing device configured to: (a) receive an input regarding creation of a user account, the user account being associated with a login portal, the login portal including one or more input fields requesting personal identifying information; (b) compare the login portal with a database of known login portals, the database including information classifying each of the one or more input fields as (1) essential input fields that require accurate personal identifying information in order for the login portal to function correctly, and (2) non-essential input fields that do not require accurate personal identifying information in order for the login portal to function correctly; (c) generate placeholder data for each of the one or more input fields that is classified as a non-essential input field; (d) send the placeholder data to the login portal as associated with each of the non-essential input fields; (e) allow the user to generate and submit accurate personal identifying information to the login portal for all essential input fields; (f) record the placeholder data and accurate personal identifying information as associated with the user account in an user account database.

Finally, in another aspect, this disclosure provides a non-transitory computer readable storage medium including instructions which, when executed by one or more computing devices, carry out a method for operating an electronic user account management system; the method comprising: (1) prompting the user to enter a variety of accurate personal identifying information; (2) generating a variety of placeholder data, the placeholder data being of the same data format as the accurate personal identifying information; (3) receiving an input regarding creation of a user account associated with a login portal, the login portal including one or more input fields requesting personal identifying information; (4) comparing the login portal with a database of known logins, the database of known logins including information describing each of the one or more input fields associated with the login portal as either essential to the functioning of the login portal or nonessential to the functioning of the login portal; (5) prompting the user to select one or more types of personal identifying information for which the user is willing to send accurate personal identifying information to the login portal even when the associated input field is non-essential; (6) generating a personal information profile, the personal information profile including: (a) accurate personal identifying information for each of the one or more essential input fields, (b) accurate personal identifying information for at least one non-essential input field selected by the user; and (c) placeholder data for one or more non-essential input fields; and (7) associating the personal information profile with the user account.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Systems to generate and secure user accounts are broadly disclosed that include placeholder data in place of accurate personal identifying information, in order to better secure that accurate personal identifying information in the event of a data breach. Related methods and apparatuses, such as smartphones or a browser plug-in installed on a computer, are also disclosed—as well as a non-transitory computer readable storage medium including instructions which, when executed by one or more computing devices, carry out a method for operating an electronic user account management system.

Most broadly, a system for managing and securing user account data may include method steps and hardware that (1) receive accurate personal identifying information, (2) generate placeholder data, and (3) associate the accurate personal identifying information and/or placeholder data with a user account for a login portal such as a website or app. Importantly, a system in accordance with this disclosure will include options for associating as little accurate personal identifying information with the user account as is reasonable possible.

For example, many websites ask for personal identifying information as part of a user account creation process. Sometimes, this information is necessary to the functioning of the site—either logistically or legally. Bank websites and government websites are examples of sites that require a large amount of personal identifying information for valid reasons. However, other sites very often ask for personal identifying information merely for marketing purposes. For example, many social sites, humor sites, news sites, and others require submission of personal identifying information merely so that they can better target ads to the person creating the user account. In these instances, systems and methods in accordance with this disclosure may enable a user to successfully create an account in order to access the site's content, without providing accurate personal identifying information that could be comprised in a data breach. More generally, a system in accordance with this disclosure may enable a user to customize the amount and nature of their personal identifying information that is shared with any particular site login—depending on the needs of the site, and the user's preferences.

Before discussing systems in accordance with this disclosure in greater detail, the following phrases are used in this disclosure with the following meanings—as further understood by a person having ordinary skill in the art.

The phrase "personal identifying information" may refer to any type of data that identifies a specific individual person. Abbreviated "PII", personal identifying information may include data like: name, email address, social security number, an government ID number (Social Security number or driver's license number), vehicle plate numbers, biometric data like fingerprints, credit card number, date of birth, place of birth, age, gender, race, mother's maiden name, pet's name, school attended, workplace, street address, and many others.

The phrase "accurate personal identifying information" therefore refers to the actual, correct information for each type of personal identifying information for a given person.

Generally, each type of personal identifying information may be of a certain data format (e.g. "MM/DD/YYYY" for date of birth). Websites and other login portals often require inputs for personal identifying information that fit these certain data formats in order for the input to be accepted, as a basic error checking method.

In contrast, "placeholder data" may refer to any data that is used in place of a type of personal identifying information. Placeholder data may be data of the same format as the personal identifying information, that is not the accurate personal identifying information. Placeholder data may in some instances be somewhat similar to accurate personal identifying information: substituting "John Doe" for the real name of "Richard Smith." In other instances, placeholder data may be essentially random strings of characters that fit the format of any given type of personal identifying information: substituting "lxqwptb lxixnqzs" for the real name of "Richard Smith." Placeholder data may be specific to one individual user, i.e. a fake name for one user may be the real name of some other individual somewhere.

The phrase "login portal" refers to the portion of any website, app, or other electronic system that requires a login in order to access content. A login portal usually requires at least a username and a password. Generally, a login portal allows a user to enter an existing username and password or to create a new user account. A login portal may therefore encompass a user account creation page, where the user may enter required data that will be associated with a newly created login and password. The phrase "user account" therefore encompasses all of this information: the username, password, and other data entered as part of the account creation process in the login portal.

Figure 1A:
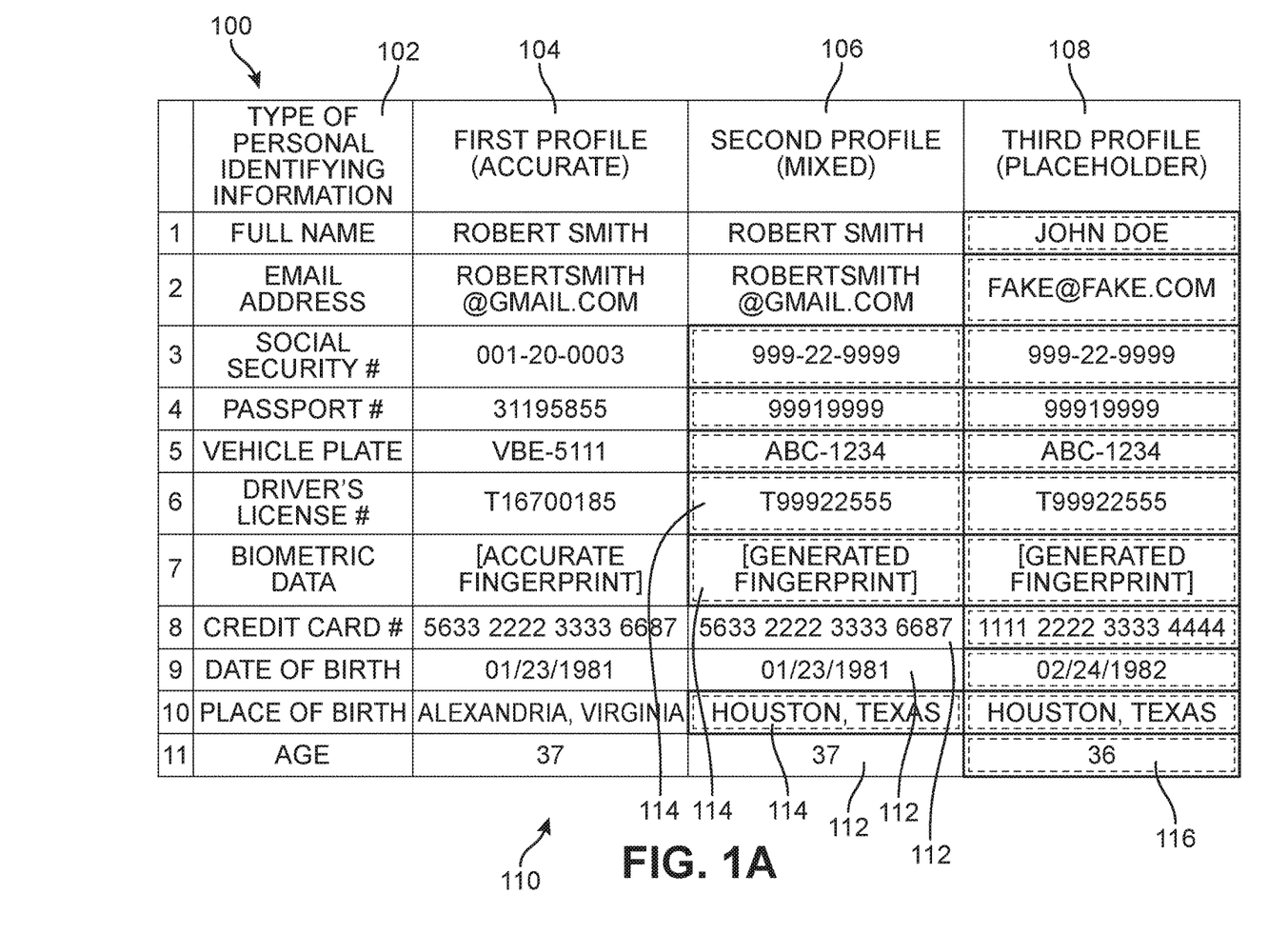
FIGS. 1a and 1b show a table of data, showing three user profiles with varying amounts of accurate personal identifying information and varying amounts of placeholder data.
Figure 1B:
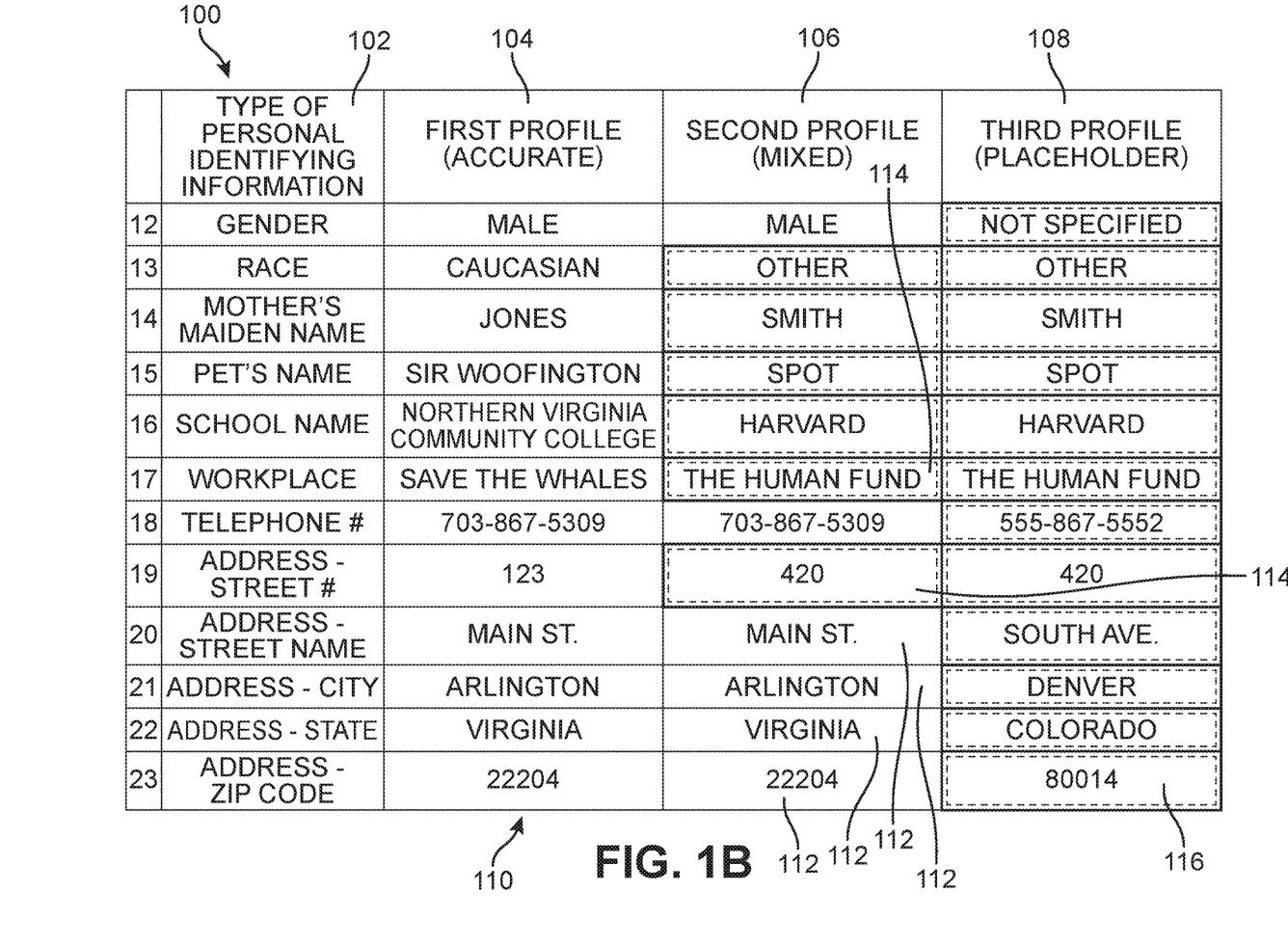

FIGS. 1a and 1b show a table 100 of data illustrating many of these features. Table 100 shows personal identifying information 102 as organized into three user profiles (104, 106, 108). In some embodiments of systems and methods in accordance with this disclosure, one or more different personal information profiles (104, 106, 108) may be created. In the first personal information profile 104, only accurate personal identifying information 110 is included. The accurate personal identifying information may be entered by a user into the system. Second personal information profile 106 includes some accurate personal identifying information 112 mixed together with some placeholder data 114. Third personal information profile 108 then includes only placeholder data 116.

Figure 4:
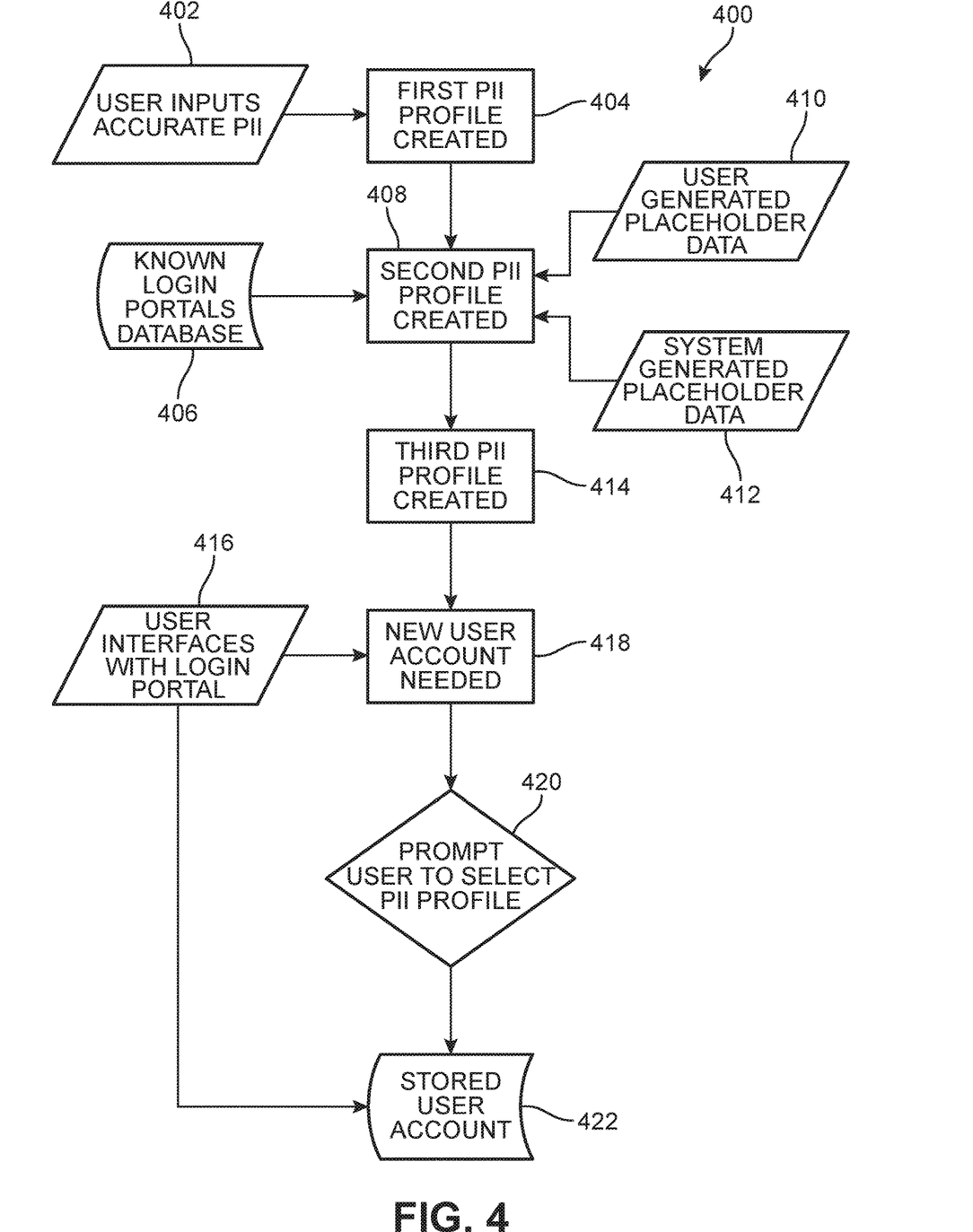
FIG. 4 is flowchart showing one embodiment of a process of creating user profiles in accordance with this disclosure.

A system in accordance with this disclosure may create the three personal information profiles (104, 106, 108) as part of a process for securing the accurate personal identifying information by minimizing its exposure. FIG. 4 shows this in greater detail, as discussed further below.

Figure 2:
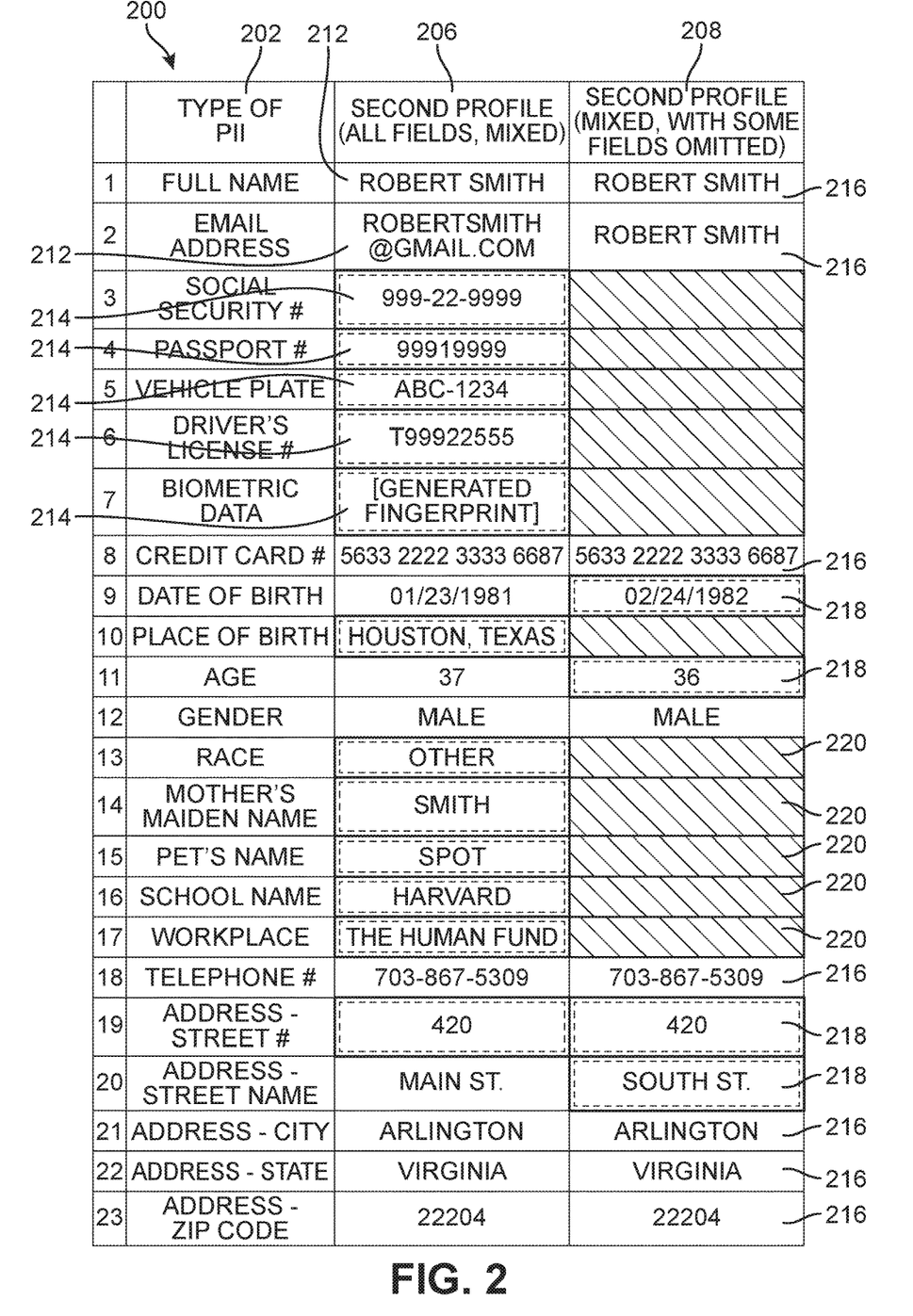
FIG. 2 is a tables of data, showing two user profiles with varying amounts of accurate personal identifying information, placeholder data, and omitted fields.

However, FIG. 2 shows another table of data 200 that illustrates another embodiment of a personal information profile. Table 200 compares two versions of personal information profiles that include a mixture of both accurate personal identifying information and placeholder data, as second profile 106 in FIGS. 1A and 1B did. The two personal information profiles (206, 208) in FIG. 2 are therefore also referred to as versions of a second personal information profile. As shown, personal information profile 206 is the same as personal information profile 106, and includes either accurate personal identifying information 212 or placeholder data 214 in each field. In contrast, personal information profile 208 includes some accurate personal identifying information 216, some placeholder data 218, and some omitted fields 220. This type of personal information profile may be useful when a login portal requests personal identifying information but does not make submission of a type of personal identifying information mandatory to access the content. Therefore, systems in accordance with this disclosure may better secure personal identifying information data by omitting some of it from being associated with a user account.

Figure 3:
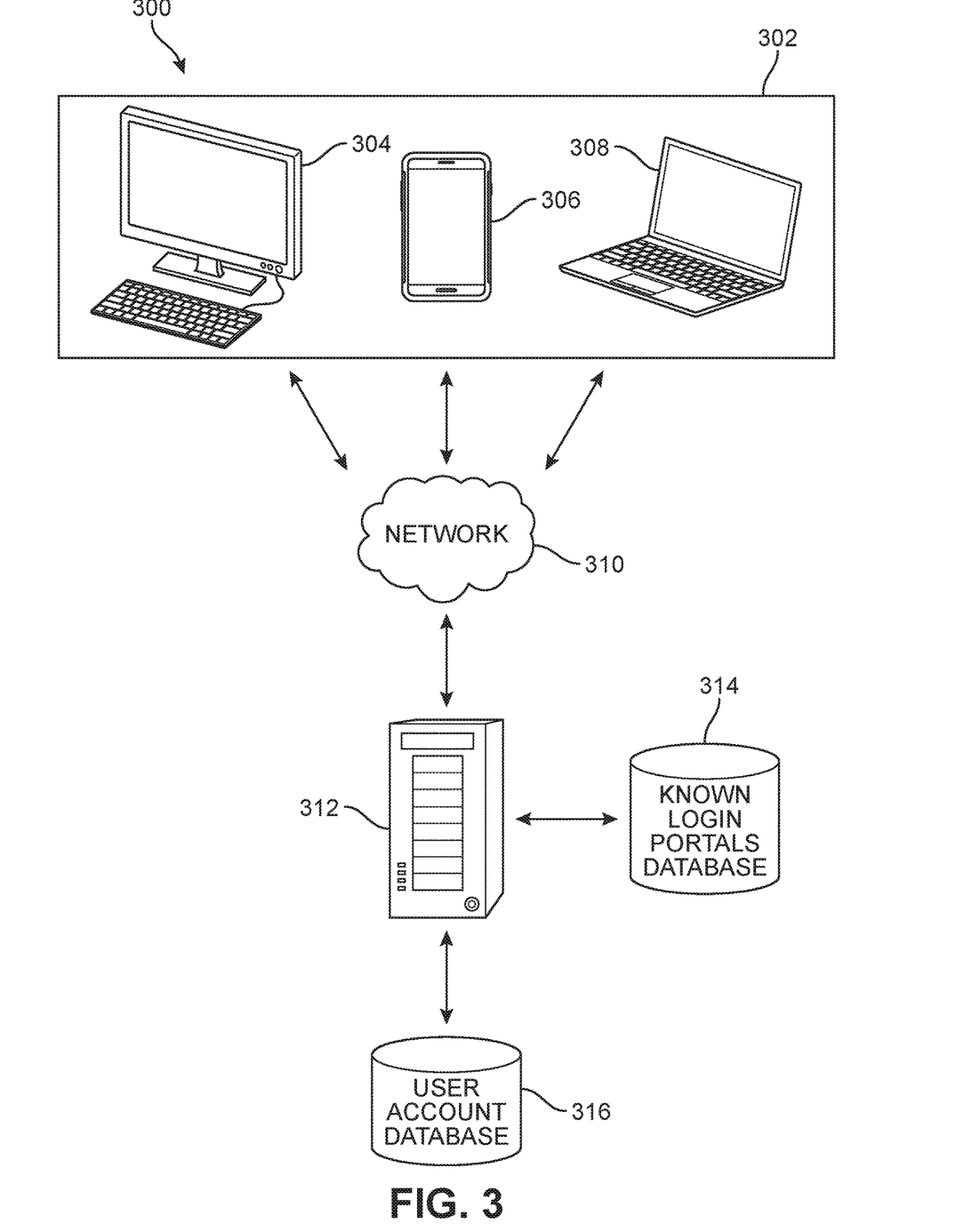
FIG. 3 is a diagram of a system of several pieces of computer hardware in communication with each other via a network, and related databases.

FIG. 3 shows a diagram of a system 300 of several pieces of computer hardware (304, 306, 308, 312) in communication with each other via a network 310, and related databases (314, 316). This system broadly illustrates one embodiment of a system in accordance with this disclosure. Generally, a user may enter information using a computing device such as a desktop computer 304, a smartphone 306, or a laptop computer 308. The source of a user input 302 may be in communication with a network 310. Network 310 may include a variety of wireless communication systems (cell phone LTE, Wi-Fi, Bluetooth, etc.) and wired communication systems (LAN, cat-6 cable, cable internet hardwire connections). The network 310 may then be in communication with a server 312. In some embodiments, server 312 may perform the digital computing steps that result in the protection of user data as described in this disclosure. Server 312 may do this by drawing information from, and writing information to, one or more databases 314, 316. Namely, database 314 may be a database of known login portals. Information about a login portal accessed by a user on a device 302 may be compared to known login portals in the known login portal database 314, as described in further detail with respect to FIG. 4 below. Server 312 may also recall information from, and storing information in, user account database 316, also as detailed with respect to FIG. 4 below.

FIG. 4 shows a first embodiment of a computing method 400 of creating, securing, and storing a user account in accordance with this invention. In this embodiment, three personal information profiles are created—which may be the same as first personal information profile 104, second personal information profile 106, and third personal information profile as shown in FIGS. 1A and 1B. Specifically, method 400 may begin with step 402 when a user inputs accurate personal identifying information. Input step 402 may be done in response to a prompt from the software system requesting one or pieces of accurate personal identifying information. The system then receives the accurate personal identifying information and creates a first personal information profile 104 in step 404. Next a second personal information profile like profile 106 is created in step 408.

Step 408 draws on several resources to create the second personal information profile 106. First, a database of known login portals 406 is in communication with the system—as shown in FIG. 3. The data base of known login portals 406 may include information regarding which personal identifying information may be necessary to the functioning of any of various login portals. For example, database 406 may include information for a banking website describing how accurate personal identifying information is largely required, or include information for a photo sharing social site describing how very little accurate personal identifying information is strictly necessary to the functioning of that site. In other words, database 406 contains a description of each of many common login portals and how much accurate personal identifying information should be shared with that login portal.

This database 406 may be centrally maintained, such as by a company that offers a system for protecting personal information in accordance with this disclosure as a paid product, or database 406 may be open sourced where users contribute the descriptive information about each login portal in a collaborative fashion like Wikipedia.

Second personal information profile 106 therefore includes several fields (each of rows 1-23 in FIGS. 1A and 1B) each of which, based on the information in database 406, includes either accurate personal identifying information or placeholder information. Placeholder information may be received from a user 410 or automatically generated by the system 412.

A third personal information profile 108 is next created in step 414. Third personal information profile 108 includes entirely placeholder data, as was created in steps 410, 412.

Next, a user interfaces with a login portal in step 416. If this is the first time the user has interfaced with this particular login portal, a new user account is created starting with step 418. Namely, the system may receive an input that the user has interfaces with a login portal and that no existing user account exists for this login portal—and so a new user account is needed. The user may then be prompted 420 to select which of the first personal information profile 104, the second personal information profile 106, or the third personal information profile 108 the user wishes to associate with this particular login portal. The system may also provide a recommendation regarding which of the personal information profiles 104, 106, 108 the user should select as part of step 420.

For example, if the login portal is a news site that requires a login to merely read a new article then the user may wish to select third personal information profile 108 so as to associate only placeholder information 116. Alternatively, if the login portal is a new social networking site then the user may wish to select second personal information profile 106—so that certain accurate personal identifying information 112 will be associated with this login portal (so friends can find the user based on real name, for example), but other information requested by the login portal would be placeholder data 114 because the user does not wish to share that personal identifying information with this particular login portal. The system then associates the selected personal information profile with the new user account created for this login portal.

The user account, including its associated personal information profile, may then be stored in a database 316 in step 422. When the user returns to this login portal 416, the user account may be recalled and used to again log into the login portal.

Although for the sake of clarity of discussion, the above method steps are described sequentially, in other embodiments within the scope of this disclosure the several steps may be performed in different orders—or simultaneously in parallel.

Figure 5:
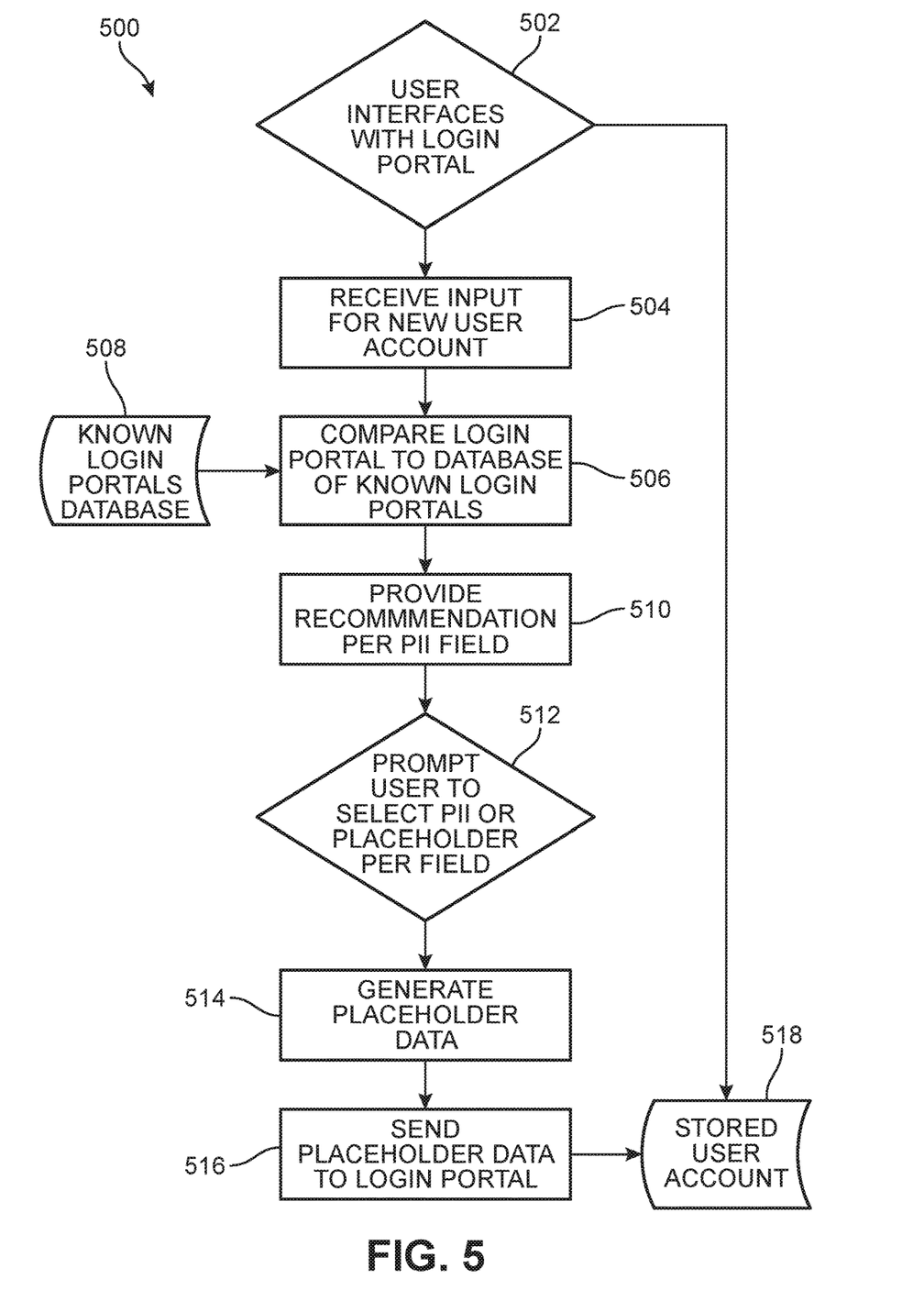
FIG. 5 is a flowchart showing a second embodiment of a process for securing and storing user account data in accordance with this disclosure.

In a second embodiment, FIG. 5 shows another computing process 500 by which a system may secure personal information by creating a user account. In process 500, a user first interfaces with a login portal in step 502. If this is the first time the user has interfaced with this particular login portal, a new user account will need to be created. The system therefore receives an input regarding creation of a user account in step 504.

Process 500 next proceeds in step 506 to compare the login portal with a database of known login portals 508. As described above, database 508 includes information describing whether each piece of personal identifying information requested by the login portal is actually necessary to the functioning of the login portal. A piece of personal identifying information may be described as necessary or essential to the functioning of a login portal when the login portal is unable to deliver the functioning or content of the site without that piece of personal identifying information being accurate—for either technical or legal reasons. All others, where the personal identifying information need not be accurate, may be described as non-essential or unnecessary.

Each separate type of personal identifying information is contained within a separate field, as shown in column 102 in FIGS. 1A and 1B. Thus, each field of personal identifying information requested by the login portal maybe classified as essential or non-essential.

Computing process 500 then provides a recommendation to the user in step 510 for each field of personal identifying information requested by the login portal. The recommendation may be done by overlaying the field as displayed within the login portal, or in a separate pop-up window, or otherwise. The recommendation may guide the user by indicating whether the user should enter accurate personal identifying information into that particular field, or whether the user can submit placeholder data instead. This recommendation therefore guides the user to minimize the amount of accurate personal identifying information submitted, but allows the user to choose other than the recommendation for any particular field if the user might have other reasons for submitting accurate personal identifying information even when not strictly necessary for a particular field.

If the user wishes to submit placeholder data instead of accurate personal identifying information for any one or more fields, then the system operating computing method 500 may receive a request for placeholder data from the user with respect to that field or fields. Computing method 500 may then generate placeholder data in step 514 for each of these selected fields.

The placeholder data is then sent to the login portal in step 516. The user would have entered accurate personal identifying information for all fields for which no request for placeholder data was received by the system. The placeholder data and set of user inputted accurate personal identifying information may then be stored in a database 316 in step 518 as associated with the user account for that login portal.

The user account including its associated data may then be recalled from database 316 upon a subsequent interaction with the same login portal. Additionally, the user account stored in step 518 in database 316 may also be searchable by the user so as to recall specific pieces of data associated with one or more user accounts. For example, database 316 may include first personal information profile 104, second personal information profile 106, and third personal information profile 108 as discussed above—and the system may include functionality that provides the user with a report or search function mechanism, so as to search within the data stored in the personal information profiles 104, 106, 108. This may allow the user to recall information, either accurate or placeholder, that has been entered into database 316 in the past. This may be useful when, for example, the user wishes to review data associated with one login portal for use with another login portal—or when a user may wish to add additional information (such as non-essential personal identifying information) to a user profile after the initial creation of that user profile.

Figure 6:
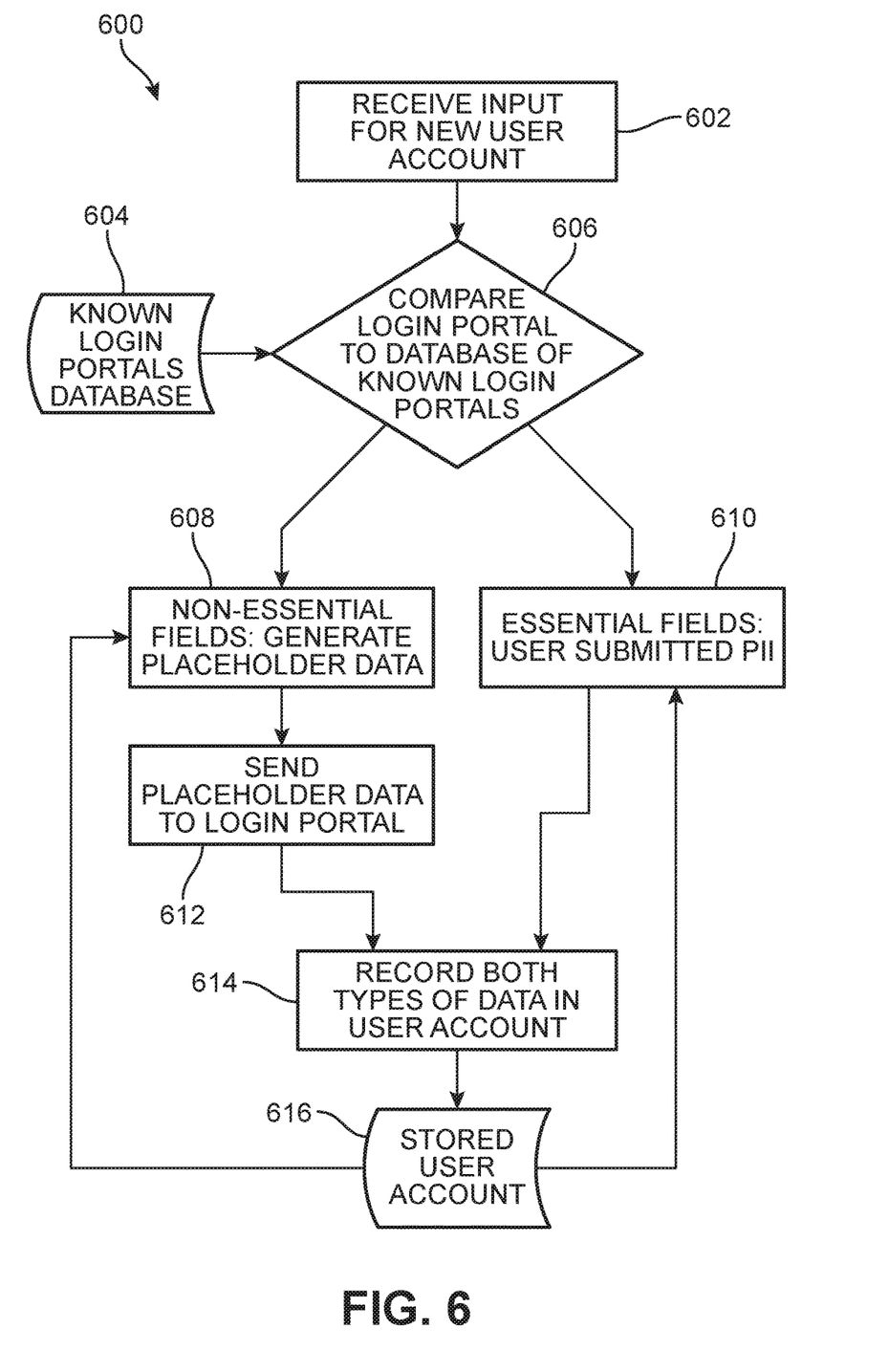
FIG. 6 is a flowchart showing a third embodiment of a process for generating and storing user account data in accordance with this disclosure.

FIG. 6 shows a third embodiment of a computing process 600 for securing personal identifying information. Many of the steps in computing process 600 are similar to equivalent steps in the previously discussed embodiments 400 and 500. The particular embodiment 600 differs from embodiment 500 in that process 600 does not provide a recommendation to the user regarding whether each field should be accurate personal identifying information or placeholder data. Instead, process 600 at step 608 directly generates placeholder data for each nonessential field and then sends the placeholder to the login portal at step 612.

Namely, process 600 still includes receiving an input that a new user account is required for a login portal at step 602. The login portal is compared at step 606 to database of known login portals 604. This comparison includes classifying each field for which the login portal requests personal identifying information as either essential or non-essential.

In this embodiment, as mentioned, process 600 automatically generates placeholder data for each field that is classified as non-essential at step 608. This placeholder data is then sent to the login portal in step 612 at each of the non-essential fields. As with prior embodiments, the user may submit to the login portal accurate personal identifying information for each of the essential fields at step 610.

The placeholder data and the user submitted accurate personal identifying information are then recorded as part of a user account in step 614. The user account may then be stored in a database 316 at step 616.

In some embodiments, accurate personal identifying information from one user account may be recalled from database 316 and used in step 610 when creating another user account. This would save the user the effort of retyping in accurate personal identifying information when that information has already been saved in database 316 as part of a previously created user account. Similarly, the same process may be done for placeholder data: previously generated placeholder data associated with a previous user account stored in databased 316 may be recalled at step 608 so as to save the effort of generating new placeholder data.

Figure 7:
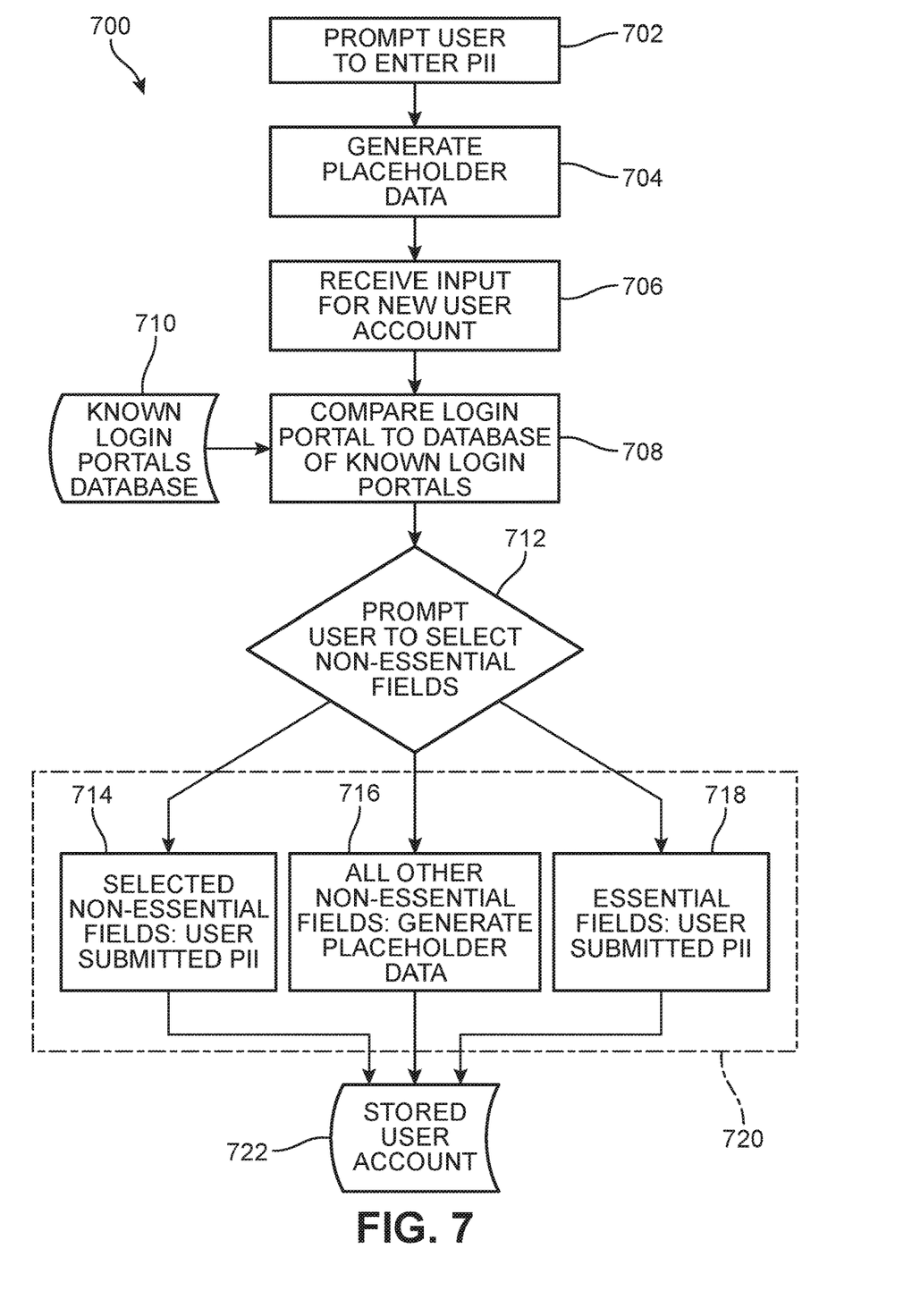
FIG. 7 is a flowchart showing a fourth embodiment of a process for creating a secure user profile in accordance with this disclosure.

Finally, a fourth embodiment of a computing process 700 is shown in FIG. 7. Process 700 includes several steps that are similar to equivalent steps in other embodiments 400, 500, 600. Similar to process 400, process 700 starts by prompting a user to enter a variety of accurate personal identifying information at step 702. Process 700 then generates placeholder data at step 704. In this way, the accurate personal identifying information and placeholder data is generated prior to being needed by a specific login portal.

As with prior embodiments, process 700 receives an input regarding creation of a new user account associated with a login portal at step 706. The process 700 then compares the login portal with a database of known login portals 712 at step 708. As discussed above, this comparison includes classifying each field of personal identifying information requested by the login portal as either essential or non-essential.

In contrast to other embodiments, process 700 includes step 712 where the user is prompted to select one or more fields of personal identifying information for which the user is willing to enter accurate personal identifying information even when the field is classified as non-essential. For example, the system performing process 700 may classify an email address field as non-essential because a site merely uses that information for marketing—but a user may in fact desire to receive marketing from the site. So, the user may select the email address field as one where the user will enter accurate personal identifying information despite the field being identified as non-essential.

Process 700 therefore includes three categories of fields: essential fields for which the user submits accurate personal identifying information 718, non-essential fields that are not selected for which process 700 generates placeholder data 716, and non-essential fields for which the user submits accurate personal identifying information 714. Process 700 therefore generates the new user account from these three groups at step 720. The user account may then be stored in a database 316 at step 722.

Figure 8:
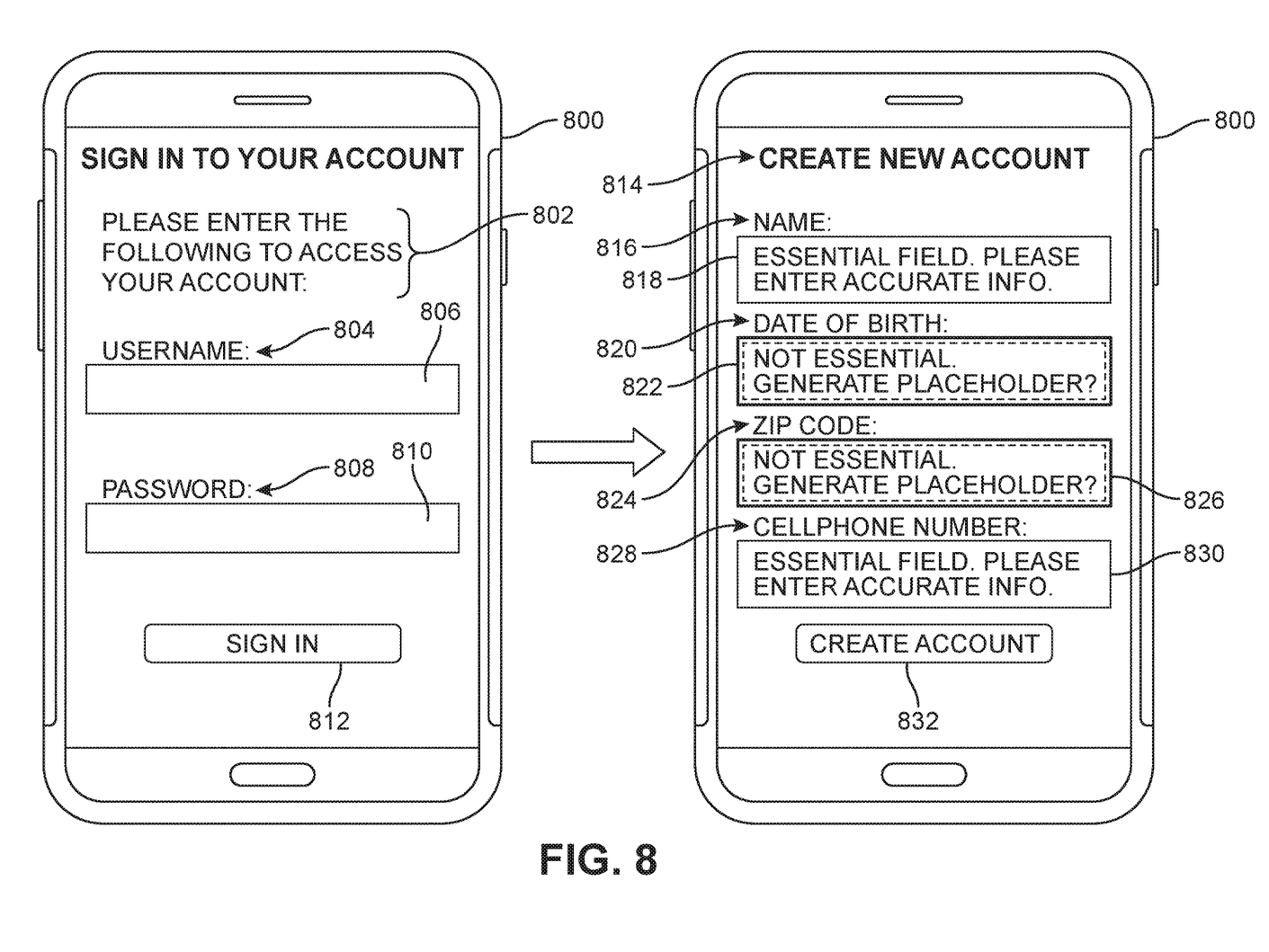
FIG. 8 is a diagram of a smartphone app in accordance with this disclosure.

FIG. 8 shows an embodiment of a system in accordance with this disclosure that is a smartphone app. Smartphone 800 may generally be any type of mobile computing device, including popular smartphone platforms like Apple iOS or Google Android. Specifically, FIG. 8 shows how a computing process like that of process 500 in FIG. 5 may appear to the user.

Namely, smartphone 800 may include an app with a browser capable of interfacing with a login portal 802 that includes a username 804 field 806, a password 808 field 810, a sign in button 812, and page to create a new account 814. New account creation page 814 includes requests for personal identifying information such as name 816, date of birth 820, zip code 824, and cellphone number 828. As a result of performing a computing process 500 on the mobile computing device of smartphone 800, the smartphone 800 provides a recommendation to the user for each personal identifying information field.

Namely, name field 818 is classified as essential to the functioning of this login portal and so smartphone 800 displays the recommendation in name field 818 of "Essential field. Please enter accurate info." The cellphone number field 830 is also classified as essential to this login portal, and so the same recommendation is displayed. On the other hand, date of birth field is identified as non-essential to the functioning of this login portal and so smartphone 800 displays the recommendation "Not essential. Generate placeholder?" This same recommendation is also shown for zip code field 824.

As a result, the user may view each of the recommendations and decide how much accurate personal identifying information they wish to incorporate into the new user account being created for this login portal.

Figure 9:
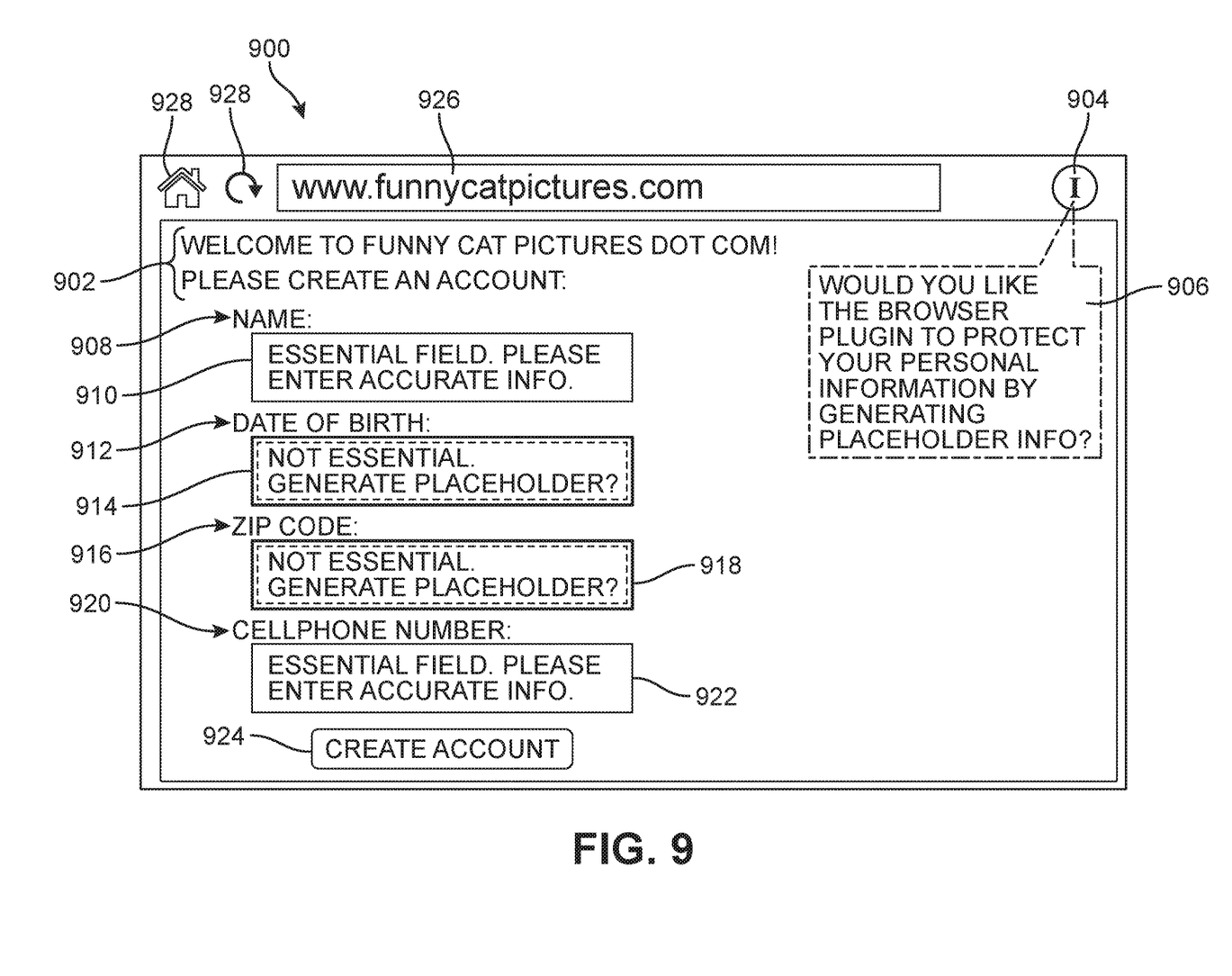
FIG. 9 is a diagram of a web browser with a browser plug-in in accordance with this disclosure.

FIG. 9 shows a similar embodiment 900, this time as a web browser plug-in such as might be used on a desktop computer 304 or laptop computer 308. Web browser plug-ins are well known in the art as a piece of software that installs as part of a web browser and adds additional functionality.

In particular, FIG. 9 shows how web browser plug-in 904 may create a pop-up window 906 upon receiving an input that the user has interacted with a new user account creation page 902. In this instance, the login portal is associated with a humor site 926. The new user account creation page requests several pieces of personal identifying information: name 9008, date of birth 912, zip code 916, and cellphone number 920. Some of these fields are classified by the web-browser plug-in as essential to the functioning of the humor site and some are classified as non-essential. The web browser plugin therefore provides recommendations for each field 910, 914, 918, and 922.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for securing electronic user account data, comprising:
   at least one computing device, the computing device including a processor, and
   wherein the computing device is configured to perform the steps of:
   prompting a user to input accurate personal identifying information;
   receiving the accurate personal identifying information and generating a first personal information profile consisting of the accurate personal identifying information;
   receiving placeholder information, the placeholder information being of the same data format as the accurate personal identifying information;
   generating a second personal information profile including a mixture of the accurate personal identifying information and the placeholder information;
   generating a third personal information profile, consisting of the placeholder information;
   receiving an input regarding creation of a user account associated with a login portal;
   prompting the user to select one of the first personal information profile, the second personal information profile, and the third personal information profile;
   associating the selected personal information profile with the user account;
   storing the user account, associated personal information profile, and the relation between the user account and the login portal, in an electronic database; and
   recalling the user account and associated personal information profile from the electronic database upon a subsequent interaction with the login portal.

2. The system of claim 1, wherein the computing device is configured to receive placeholder information through at least one of generating the placeholder information, and prompting the user to input placeholder information.

3. The system of claim 1, wherein the system is configured to, when generating the second personal information profile, include accurate personal identifying information only to the extent necessary to the functioning of the login portal, and include placeholder information otherwise.

4. The system of claim 1, wherein the system is configured to, when generating the second personal information profile, include at least some accurate personal identifying information that is not essential to the functioning of the login portal, as determined by a user input in response to a prompt.

5. The system of claim 1, wherein the system further comprises a database of known login portals in communication with the at least one computing device;
   the database of known login portals including information regarding what personal identifying information is requested by each known login portal, what requested personal identifying information is essential to the functioning of each known login portal, and what requested personal identifying information is nonessential to the functioning of each known login portal; and
   the system is further configured to compare the login portal to the database of known login portals, and generate the placeholder information corresponding to the requested personal identifying information that is nonessential to the functioning of the login portal.

6. The system of claim 1, wherein the system further comprises a database of known login portals in communication with the at least one computing device;
   the system is configured to compare the login portal to the database of known login portals; and
   the computing device is configured to perform the further step of: providing to the user a personal information profile recommendation, the personal information profile recommendation including which of the first personal information profile, the second personal information profile, and the third personal information profile should be associated with the user account.

7. The system of claim 1, wherein the computing device is configured to receive placeholder information through generating the placeholder information, and the placeholder data is a randomized string of characters having the same data format as the corresponding accurate personal identifying information.

8. The system of claim 1, wherein the system further comprises a database of known login portals in communication with the at least one computing device;
   the database of known login portals including information regarding what personal identifying information is requested by each known login portal, what requested personal identifying information is essential to the functioning of each known login portal, and what requested personal identifying information is nonessential to the functioning of each known login portal; and
   the system is further configured to compare the login portal to the database of known login portals, and generate the second personal information profile based on the information in the database of known login portals.

9. The system of claim 1, wherein the computing device is configured to perform the step of generating the second personal information profile by:
   accessing a database of known login portals in communication with the at least one computing device;
   receiving from the database of known login portals data regarding what requested personal identifying information is essential to the functioning of the login portal; and
   generating the second personal information profile such that the second personal information profile includes accurate personal identifying information in only one or more fields identified in the database of known login portal as being essential to the function of the login portal.

10. The system of claim 1, wherein the computing device is configured to perform the step of generating the second personal information profile by:
    accessing a database of known login portals in communication with the at least one computing device;
    receiving from the database of known login portals data regarding what requested personal identifying information is nonessential to the functioning of the login portal; and
    generating the second personal information profile such that the second personal information profile includes placeholder information in all of one or more fields identified in the database of known login portal as being nonessential to the function of the login portal.

* * * * *